Dec. 25, 1962 W. L. LEHMANN ET AL 3,070,699

PHOTOVOLTAIC SOLAR ORIENTING DEVICE

Filed Sept. 26, 1961

INVENTORS
RUSSELL W. RUNNELS
WILLIAM L. LEHMANN
BY Wade Koontz
Orlando Z. McCoy
ATTORNEYS 3,070,699
PHOTOVOLTAIC SOLAR ORIENTING DEVICE
William L. Lehmann, 6705 Timberline Drive, Dayton, Ohio, and Russell W. Runnels, R.R. 1, Wilmington, Ohio
Filed Sept. 26, 1961, Ser. No. 140,953
3 Claims. (Cl. 250—203)
(Granted under Title 35, U.S. Code (1952), sec. 266)

The invention described herein may be manufactured and used by or for the United States Government for governmental purposes without the payment to us of any royalty thereon.

This invention relates to a photovoltaic solar orienting device and more particularly to a device that automatically maintains the plane of its flat surface on which photovoltaic solar cells are mounted normal to the direction from which light rays arrive at the surface cells and thereby maintain their optimum electrical output.

The object of this invention is to provide a device that is directionally responsive to light energy that is applied to it. The device is used directionally in the orientation of radio antenna, cameras and the like. The photovoltaic solar cells or the device emit optimum electrical output due to the orientation characteristic of the device when the plane of their faces against which light rays from the sun are incident is normal or makes a 90° angle within the direction of the light rays.

An illustrative device that embodies the present invention is shown in the accompanying drawings wherein.

Figures 1, 2, 3, 4:
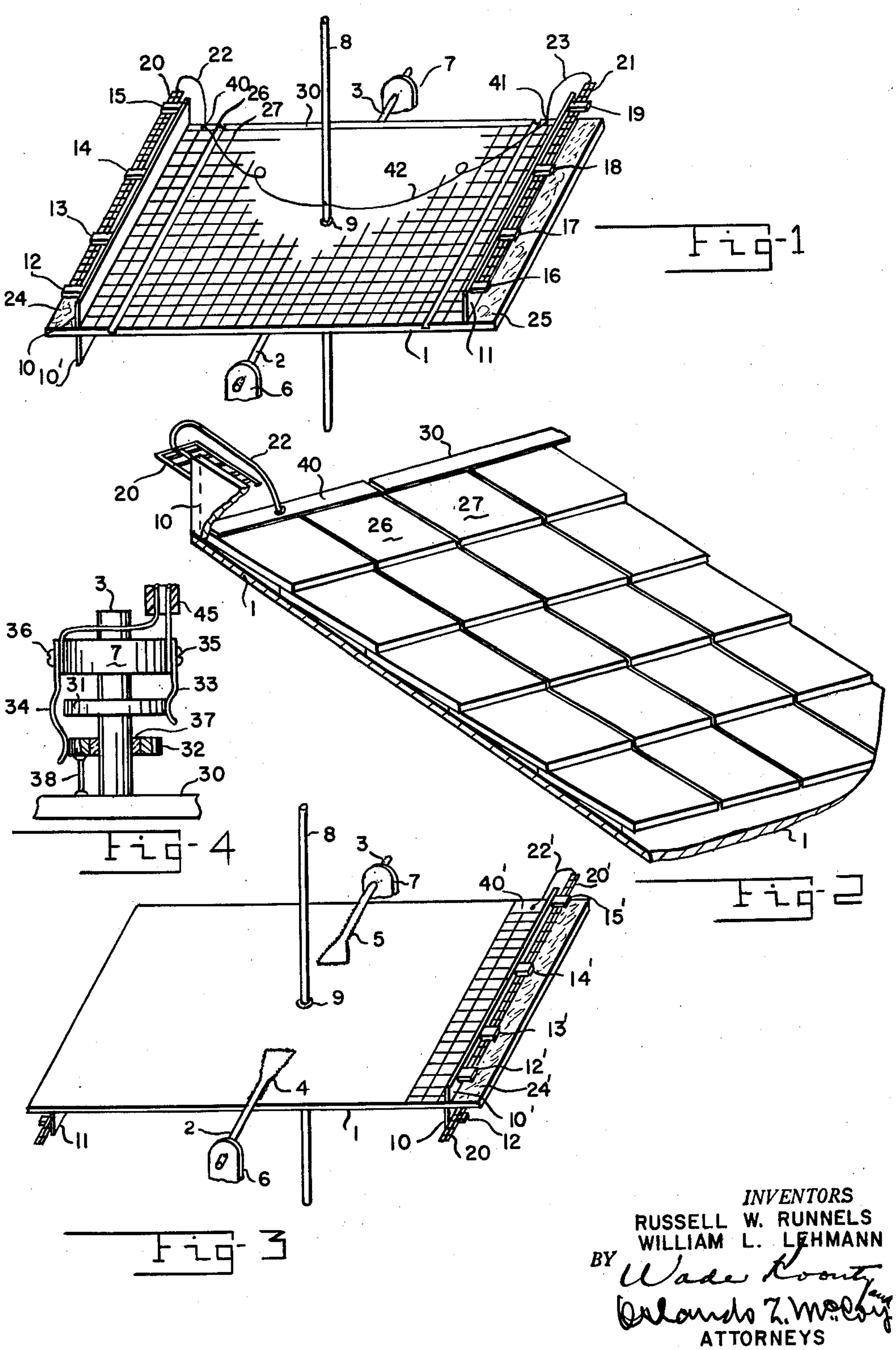
FIG. 1 is a fragmentary perspective view of the device with its solar energy incident face uppermost and with its center electrode extending directly towards the sun.
FIG. 2 is a fragmentary enlarged portion of the device in FIG. 1 showing the photovoltaic solar cell overlap on a metal ground plate and bus bar contacts that are of polarity above ground.
FIG. 3 is a perspective view of the underside of the device in FIG. 1.
FIG. 4 is a fragmentary, enlarged plan view of a connection from the photovoltaic cells in FIG. 2 to equipment within the satellite that carries the device.

The device that is shown in FIG. 1 of the accompanying drawings consists of a flat aluminum ground plate 1 that is carried by a pair of rods 2 and 3 that are welded at 4 and 5 to the underside of the plate 1. The rods 2 and 3 are aligned with each other and serve as shafts in bearings that are mounted for free shaft movement in the pair of supports 6 and 7. The supports 6 and 7 are of electrically nonconductor material, such as plastics or the like. An aluminum center electrode 8, that illustratively is twice as long as the plate 1 is wide, is securely mounted in an insulating porcelain collar 9 at the center of the ground plate 1 to extend normal to the plate 1 an equal distance both above and below the plate.

Aluminum shadow shields 10 and 11 have contact edges welded to the upper face of the ground plate 1 at equal distances from the opposite lateral edges of the plate 1. A desired plurality of ceramic insulating bars 12 to 15, inclusive, are secured by an electrically insulating epoxy resin adhesive adjacent to the unattached upper edge of the shadow shield 10 and a corresponding plurality of ceramic insulating bars 16 to 19, inclusive, are similarly mounted adjacent to the unattached upper edge of the shadow shield 11.

An aluminum screen 20 is attached by an epoxy resin adhesive to the ceramic insulating bars 12 to 15, inclusive, and a duplicate aluminum screen 21 is similarly attached to the ceramic insulating bars 16 to 19. The screens 20 and 21 have ends of accelerating grid lead wires 22 and 23 respectively, soldered to the screens at the rear ends thereof.

The accelerating grid lead wires 22 and 23 connect the screen grids 20 and 21 to bus bar contacts 40 and 41, respectively throughout. The bus bar contacts 40 and 41 are at the upper ends of banks or columns of overlapping shingle mounted photovoltaic cells such, for example as the cell 26 that are adjacent to the shadow shields 10 and 11 respectively. The bus bar contacts 40 and 41 impress a predetermined positive potential on the grids 20 and 21 which grid potential functions to attract and to accelerate electrons emitted from the photo-emissive surfaces 24 and 25 positioned at the opposite ends of the upper surface of the plate 1 and outwardly from the shadow shields 10 and 11.

The center electrode 8 is maintained at the same positive potential as the grids 20 and 21 by being connected by the wire lead 42 to the two bus bar contacts 40 and 41, such that electrons that pass through the interstices of the grids 20 and 21 are attracted to the center electrode 8.

The photo-emissive surfaces 24 and 25 are made by electroplating within a suitable vacuum, such as a vacuum of $10^{-6}$ mm. mercury, a thin film a few thousandths of an inch thick, of antimony on the aluminum plate 1 and then vacuum depositing at $10^{-6}$ mm. mercury, a thin film of cesium of a few thousandths of an inch thick on the antimony, or by other published method, to yield a photo-emissive surface on the top surface of the plate 1.

When sunlight strikes the described solar orienting device, a voltage is generated by the photovoltaic cells 26, 27 etc. and the positive potential of the bus bar contacts 40 and 41 is established on the grids 20 and 21. Simultaneously, electrons are emitted from the photo-emissive surfaces that are not shaded by the shadow shields 10 and 11. These emitted electrons are accelerated by the grids 20 and 21. Most of the electrons pass through the grids to be collected by the center electrode 8. As the electrons are accelerated by the grids 20 and 21, they exert reaction forces on the grids. A mechanical torque is thereby created and is applied about the axis determined by the supporting rods 2 and 3, under the weightless condition of interstellar space.

When the device is tipped with respect to the incident direction of arrival of the sun's rays, so that the surface 24 is shaded by the shadow shield 10, more electrons will be emitted and accelerated from the surface 25 than from the surface 24. This results in a torque which rotates clockwise the device in FIG. 1 until the surface 24 is no longer shaded. Equal numbers of electrons are then again emitted from surfaces 24 and 25 and the two opposing torques balance each other around the supporting rods 2 and 3 at center of rotation.

The entire area of the upper surface of the plate 1 between the shadow shields 10 and 11 in FIGS. 1 and 2 as shown, is covered with a plurality of photovoltaic solar cells 26, 27 etc. The solar cells 26, 27 etc. consist of silicon, germanium, cadmium sulfide or the like arranged in rows and in columns or banks. FIG. 2 shows several cells connected electrically in series to form a bank of cells, and two or more banks of cells are connected electrically in parallel.

The series connected bank of cells in FIG. 2 overlie the plate 1 in a shingle or overlapping arrangement, with electrical connections made between the top surface of one cell and the bottom surface of the cell overlapping it. Banks of cells may then be soldered or otherwise connected electrically in parallel, as is partially shown in FIG. 2 by bus bars 40 and 30. The other parallel connection is formed by electrically connecting the bottom surfaces of the cells, farthest from the bus bar 40 or 30 to the aluminum base plate 1 by solder or other means.

The cells illustratively are mechanically secured to the upper surface of the ground plate 1 by a suitable insulating adhesive such as an epoxy resin or the like, positioned between the ends of the cells.

The banks of cells connected to bus bar contacts 40 and 41 supply electrical power for the accelerating grids 20 and 21, while the banks of cells covering the rest of the aluminum plate 1 provide electrical power for other uses in the satellite through the bus bar 30.

Sunlight shining on the solar cells, such as the cells 26, 27 etc. cause electron flow-out of the N-face of the cells. This electron flow is transmitted into the satellite for use in equipment such as radio, photographic, propulsion, directional control and the like, by a suitable connection, such as that shown in FIG. 4 of the drawings.

The electrical take-off from the device in FIG. 1, as illustrated in FIG. 4, comprises a pair of brass contact rings 31 and 32 of opposite polarity that are secured to and that move with the rod 3. The contact rings 31 and 32 have cylindrical surfaces that are frictionally engaged by spring loaded wiping contacts 33 and 34 that are attached by screws 35 and 36, respectively throughout, to the immovable support 7 of insulating material in which the shaft 3 is journalled for rotation. The ring 32 has an electrically insulating inner ring 37 of a ceramic or the like, between it and the rod 3. The ring 32 is connected directly to the bus bar contact 30 by an electrical energy conducting wire 38 that is welded at one end to the brass ring 32 and at its opposite end to the bus bar contact 30, such that the ring 32 moves with the plate 1.

A satellite in orbiting the earth, may reverse the device shown in FIG. 1 so that it emerges into the sunlight upside-down. Provision is made for this contingency as illustrated in FIG. 3 of the drawings by the disposition on the lower surface and at one end only of the ground plate 1 of a duplicate that is indicated by comparable reference numerals primed, of the shadow shield 10, ceramic bars 12 to 15, inclusive, screen grid 20, grid terminal wire lead 22 and photo-emissive surface 24 that is on the upperside of the plate 1 at its left hand end as illustrated in FIG. 1 of the drawing.

The application of the sun's energy to the one on the photo-emissive surface 24′ on the lower surface of the plate 1 causes the ground plate 1 to rotate around its rods 2 and 3 and to present to the sun's rays the upperside of the plate 1, as shown in FIG. 1.

The upperside two photo-emissive surfaces 24 and 25 and the shadow shields 10 and 11 at the opposite ends of the plate 1 have equal moment arms to the center of rotation at the rods 2 and 3 and serve to maintain the plane of the solar cells on the upperside of the ground plate 1 normal to the direction of the light rays incident to the cells.

The maintenance of a continuous orientation of the plane of the photovoltaic solar cells normal to incident rays of the sun's energy provides an optimum conversion of the sun's energy directly into electrical power that is delivered as described herein over the cable 45 in FIG. 4, to the satellite or other space vehicle that carries the device that is disclosed herein to use the sun's energy to meet power requirements.

The operation of the device that is described herein is applicable to any device where it is desirable to maintain a prescribed relationship of the device with respect to the direction from which the sun's energy is incident to the device.

The operation of the device that is disclosed herein is rotatably actuated by the emission of electrons from the antimony and cesium on the photo-emissive surfaces 24, 25 and 24′ that are positioned along the ends or adjacent to the lateral edges of the plate 1. The photo-emissive surfaces 24 and 25 are of equal areas and are of as nearly equal photo-emissive recoil value as can be accomplished.

Elemental antimony and cesium are both easily excited by energy from the sun resulting in the emission of electrons from the photo-emissive surfaces 24 and 25 or 24′. The emission of electrons and subsequent acceleration produces the phenomenon of recoil and a consequent torque.

When electrons are emitted from the photo-emissive surfaces, 24 and 25, the electrons are accelerated by the force due to the electric field set up by the accelerating grids 20 and 21 and the base or ground plate 1. This causes a reaction force in accordance with Newton's Third Law. See Sears and Zemansky, College Physics by F. W. Sears and M. W. Zemansky published in 1960 by Addison-Wesley Publishing Company, Inc., Reading, Massachusetts, Part I, Chapter 24, page 20, which explains recoil as Newton's Third Law of Motion.

In accordance with Newton's Third Law a reaction force is exerted on the grids 20 and 21 and on the base or ground plate 1, which produces a torque about the axis of the rods 2 and 3. The electrons that strike the center electrode 8 exert a force on the electrode 8. Since the lever arm at the electrode 8 is zero no torque is exerted about the axis rods 2 and 3 from the electrode 8. The electrons that are emitted by the photo-emissive surfaces 24 and 25 and that pass through the grids and hence the electric field exert a force due to their acceleration away from the surfaces which results in a torque about the axis of the rods 2 and 3.

The aluminum screening accelerating grids 20, 21 and 20′ have applied thereto separately over their terminal leads 22, 23 and 22′, the voltage derived from the banks of solar cells adjacent the respective shadow shields 10, 11 or 10′. The turning of the device around the rods 2 and 3 changes quantitatively the amount of the sun's energy that is applied to the photo-emissive surfaces 24 and 25 due to the shadow effect of the shadow shields 10 and 11.

The ideal situation is where the center electrode 8 points directly upwardly to the sun, such that energy from the sun is applied at a uniform magnitude over the upper area of the structure.

In the event the device rotates around the aligned rods 2 and 3 so that the right side of the device in FIG. 1 is depressed, then the right shadow shield 11 casts its shadow on the photo-emissive surface 25 adjacent to the shield 11 and decreases the particle emission from the surface 25, without effecting the potential on either grid 20 or 21 since the wire connector 42 connects the grids 20 and 21 to each other. Under this circumstance the right hand shadow shield 11 casts its shadow on the photo-emissive surface 25 to decrease its recoil force and to permit the recoil force of the photo-emissive field 24 to return the plane of the photovoltaic cells to normal to the direction from which the sun's rays arrive at the cells. Under the reverse circumstance the left side of the device is depressed and the right hand photo-emissive surface 25 exerts the greater recoil force and returns the plane of the photovoltaic cells to normal to the direction of the sun's rays.

The electrical connection between the power source in FIG. 1 and the satellite to which the power is to be supplied may, if preferred, be a plurality of radially alternated brass and bakelite rings concentric with the rod 3 and with each other and with spring loaded contacts on both sides of each brass ring, not shown, within the concept of this invention.

It is to be understood that the structure and the details of the device that are disclosed herein as being an operative embodiment of the present invention and that changes and modifications may be made therein without departing from the scope of the present invention.

We claim:

1. A photovoltaic solar orienting device comprising an electrically conducting ground plate having upper and lower surfaces and having opposite ends, ground plate supporting rod means midway between its opposite ends about which rod means the plate is free to tilt, an electrically conductive electrode disposed centrally of and extending normal to and away from the ground plate, insulator means between the ground plate and the centrally positioned electrode, a photo-emissive surface at each of the opposite ends of the ground plate, a shadow shield adjacent to and mounted to be normal to each of the photo-emissive surfaces and each shadow shield adapted for casting its shadow selectively upon one of the photo-emissive surfaces on the tilting of the ground plate, a wire mesh grid supported from adjacent the upper edge of each of the shadow shields and overlying the photo-emissive surface, and a bank of photovoltaic cells secured to the ground plate in overlapping shingle arrangement adjacent each shadow shield with the lower forward edge of the foremost cell of the bank connected electrically to the ground plate and the upper rear edge of the rearmost cell of the bank connected electrically to the rear ends of both wire mesh grids and to the centrally positioned electrode and with the cells between the foremost cell of the bank and the rearmost cell of the bank insulated from the ground plate.

2. The device defined by the above claim 1 wherein one end only of the ground plate lower surface is provided with a photo-emissive surface for exerting a tilting effect on the ground plate.

3. The device defined by the above claim 1 wherein the photo-emissive surfaces at each opposite end of the ground plate are of substantially equal areas.

No references cited.